(12) United States Patent
Fritz

(10) Patent No.: US 10,993,560 B2
(45) Date of Patent: May 4, 2021

(54) PLASTIC VESSEL COMPRISING AN ACCOMMODATED METAL ELEMENT AND METHOD OF PRODUCING THE SAME

(71) Applicant: maglassX GmbH, Freyung (DE)

(72) Inventor: Christoph Fritz, Mauth (DE)

(73) Assignee: MAGLASSX GMBH, Freyung (DE)

( * ) Notice: Subject to any disclaimer, the term of this patent is extended or adjusted under 35 U.S.C. 154(b) by 0 days.

(21) Appl. No.: 15/916,410

(22) Filed: Mar. 9, 2018

(65) Prior Publication Data

US 2018/0255948 A1  Sep. 13, 2018

(51) Int. Cl.
| | |
|---|---|
| *A47G 19/22* | (2006.01) |
| *B65D 1/26* | (2006.01) |
| *B29C 45/00* | (2006.01) |
| *B29C 69/00* | (2006.01) |
| *B65D 8/00* | (2006.01) |
| *B29L 31/00* | (2006.01) |

(Continued)

(52) U.S. Cl.
CPC ..... *A47G 19/2261* (2013.01); *A47G 19/2227* (2013.01); *B29C 45/006* (2013.01); *B29C 69/00* (2013.01); *B65D 1/265* (2013.01); *B65D 15/16* (2013.01); *A47G 2200/106* (2013.01); *B29C 2045/0067* (2013.01); *B29K 2067/00* (2013.01); *B29K 2069/00* (2013.01); *B29K 2105/203* (2013.01); *B29K 2705/12* (2013.01); *B29K 2995/0008* (2013.01); *B29L 2031/7132* (2013.01); *B65D 2313/04* (2013.01); *H01F 7/02* (2013.01)

(58) Field of Classification Search
CPC ............ A47G 19/2261; A47G 2200/10; A47G 19/10; Y10S 206/818; B65D 1/24; B65D 2313/04
See application file for complete search history.

(56) References Cited

U.S. PATENT DOCUMENTS 2,217,514 A    10/1940  Henry
2,219,576 A *  10/1940  Moreland ............... B29C 65/00
                                                          156/69

(Continued)

FOREIGN PATENT DOCUMENTS

DE        2356912 A1   5/1975
DE    202015000449 U1   2/2015

(Continued)

*Primary Examiner* — Anthony D Stashick
*Assistant Examiner* — Blaine G Neway
(74) *Attorney, Agent, or Firm* — Hoffman Warnick LLC

(57) ABSTRACT

The invention relates to a plastic vessel comprising a metal element which is accommodated its base, wherein the plastic vessel comprises a vessel element and a cover, such that the plastic vessel is formed in two pieces, wherein a recess is formed in the base of the vessel element, said recess being enclosed by the cover such a that a central closed region of the recess is provided, which accommodates the metal element, and wherein the vessel element and the cover are connected to one another thermoplastically under pressure. Moreover the invention relates to a method for producing a plastic vessel while using the thermoplastic properties of the plastic, and to the use of the vessel in interaction with a suitable means of transport and/or in a vehicle of any kind and/or for the usage by persons with reduced motor skills, perception, attention, and/or as a decorative element.

11 Claims, 7 Drawing Sheets

(51) Int. Cl.
*B29K 105/20* (2006.01)
*B29K 67/00* (2006.01)
*B29K 69/00* (2006.01)
*B29K 705/12* (2006.01)
*H01F 7/02* (2006.01)

(56) References Cited

U.S. PATENT DOCUMENTS

| | | | | |
|---|---|---|---|---|
| 4,308,955 | A | * | 1/1982 | Schieser ............ B65D 1/0223 206/509 |
| 4,466,552 | A | * | 8/1984 | Butterworth ............ A61L 2/26 206/439 |
| 5,314,625 | A | * | 5/1994 | Farnelli ............ B01D 21/0009 184/6.25 |
| 7,586,417 | B2 | * | 9/2009 | Chisholm ............ B65D 23/14 206/216 |
| 2004/0136177 | A1 | | 7/2004 | Lewis et al. |
| 2005/0087255 | A1 | | 4/2005 | Humphrey et al. |
| 2014/0332538 | A1 | | 11/2014 | Chen |
| 2015/0251812 | A1 | * | 9/2015 | Gillie .................... B65D 25/10 248/683 |

FOREIGN PATENT DOCUMENTS

| | | | |
|---|---|---|---|
| EP | 0143233 | A2 | 6/1985 |
| FR | 2820963 | A1 | 8/2002 |
| GB | 1083176 | A | 9/1967 |
| KR | 2005099937 | A * | 10/2005 |
| KR | 20140059465 | A | 5/2014 |
| WO | 2016160565 | A1 | 10/2016 |

\* cited by examiner

PLASTIC VESSEL COMPRISING AN ACCOMMODATED METAL ELEMENT AND METHOD OF PRODUCING THE SAME

FIELD OF THE INVENTION

The present invention relates to a plastic vessel comprising an accommodated metal element and to a method of producing the same. The present invention relates in particular to a plastic vessel comprising, in particular a magnetic metal element for use in interaction with a means of transport and in particular for use in a vehicle of any type, and/or for persons with reduced motor skills and/or attention and/or perception and/or as a decorative element.

RELATED ART

The German Utility Model DE202014002819U1 discloses a magnetic and metal element for vessels and furnishing elements for non-slip positioning of vessels in a vehicle, whereby it is proposed to arrange a magnetic element at the bottom of a vessel made of any material and any type, wherein the magnetic element can be embedded in the bottom of the vessel, and wherein the vessel can be made of plastic by means of injection molding.

During injection molding of plastic such as copolyester, polypropylene and, in particular, polycarbonate, temperatures of more than 300 degrees of the liquid plastic occur, and the thermoplastic properties of the plastic become completely effective during cooling and during the solidification of the plastic, the volume shrinkage of which in the case of polycarbonate being approximately 0.5 to 0.7%. A metal element has comparatively greatly differing thermal expansion properties. Therefore, when an embedded metal element is already placed at its intended position in particular in the vicinity of the base of the plastic vessel, during the injection molding process of the plastic, in particular in the vicinity of the metal element which is arranged at the bottom of the vessel and which is completely embedded by the curing and solidifying plastic, cracks in the plastic are caused cropping up starting from the injection point, which become increasingly larger, in particular in the case of considerable demands by use, for example in the case of repeated dish-washing of a vessel which is used, for example, as a drinking glass.

For this reason, a metal element embedded in a plastic vessel during the injection molding leads to formations of the vessel that are defective in the surroundings of the embedded metal element and/or to an undesirably short service life of a macroscopically intact vessel.

Therefore such a vessel with undesirable cracks cannot meet common aesthetic requirements, since it can no longer be satisfactorily maintained or cleaned. In addition, there is the risk that the plastic which is incompletely surrounding the metal element no longer sufficiently protects the metal element from external influences, as they occur, for example, during cleaning in a dishwasher, having the effect that the metal element can also be impaired.

When the metal element furthermore comprises a magnet, which is desirable in particular for the use of a vessel as a slip-resistant vessel in interaction with a means of transportation and in particular for use in a vehicle, the magnetic remanence of the magnet will not only be considerably demagnetized at a temperature in a temperature range of above 300 degrees (Celsius), but can already be massively affected in a lower temperature range of e.g. 200° C.

The WO2012/006428A1 discloses a vessel comprising a radio-frequency identification tag (RFID tag), wherein in particular the visual appearance of the vessel is greatly changed.

SUMMARY OF THE INVENTION

It is therefore an object of the present invention to provide a plastic vessel with a metal element, which is embedded in the vicinity of the base of the vessel, and which satisfies the highest aesthetic requirements, such that the vessel is even adequate for the use as a decorative element, which has a satisfactorily long service life, which is insensitive to external influences, such as, for example, weather influences, which can also be cleaned without hesitation, for example in dishwashers, and which is also capable of accommodating a magnetic metal element in the vicinity of its base without affecting its intended magnetization during its production, so that the vessel is particularly suitable for use as a slip-resistant vessel in interaction with a means of transport and also in interaction with suitable furnishing elements, and so that the vessel is particularly suitable for use in a vehicle of any kind, and moreover that the vessel is suitable for use as a slip-resistant, safe standing and manageable vessel for persons with reduced motor skills and/or attention and/or perception and/or as a decorative element.

In this connection it is another object of the present invention to provide a method for producing a plastic vessel which is suitable for a plastic vessel according to the invention and which is particularly suitable for cost-effective industrial mass production.

The objects of the invention are solved with the features of the independent claims. Preferred embodiments of the invention are set forth without limitation in the features of the subclaims and/or the following description which is accompanied by schematic drawings.

The invention relates in particular to a plastic vessel which accommodates a metal element in its base, wherein the plastic vessel is formed in two pieces with a vessel element and a cover, and wherein a recess is formed in the base of the vessel element, which is covered by the cover in such a way that a central closed region of the recess is provided, which accommodates the metal element, and wherein the vessel and the cover are connected to one another thermoplastically under the action of pressure.

The above thermoplastic joining is particularly advantageous, since, by means of thermoplastic shrinkage of the vessel element during the cooling and curing thereof whereby the cover has already been completely solidified, or in the event of thermoplastic shrinkage of the cover during the cooling and curing thereof whereby vessel element has already been completely solidified, in each case at a suitable selected pressure, which presses the cover onto the vessel element, and at a preferred predetermined temperature, wherein the pressure and in particular the temperature are selected such that, when the vessel element and the cover are connected, no cracks occur in the plastic and the magnetic properties of a magnetic metal element are not impaired.

According to a preferred embodiment of the invention, the recess for accommodating the metal element of an above vessel element according to the invention comprises, in particular, an outer edge and an inner edge being spaced apart from the outer edge, which surrounds the central region of the recess for accommodating the metal element, so that a region of the recess which surrounds the central region is provided between the inner and outer edge.

In this embodiment, the cover comprises an arc which rises with respect to the central region of the cover and surrounds the central region of the cover. The arc surrounding the central region is designed so as to correspond to the region of the recess surrounding the central region of the vessel element, so that, when the region for accommodating the metal element is covered by the cover, the arc of the cover is arranged in the region of the recess of the vessel element which surrounds the region for accommodating the metal element.

In this embodiment of the invention, the aforementioned arc of the cover has an outer edge, which represents the outer edge of the cover, and which corresponds to the outer edge of the vessel element and is arranged adjacent thereto, and an inner edge, which corresponds to the inner edge of the vessel element and is arranged adjacent thereto.

By the above preferred structure according to the invention with an accordingly meandering structure of a section of the cover, the profile of which corresponding to the structure of the base of the vessel element, an advantageously large contact surface is provided between the vessel element and the cover for the stable and tight connection thereof.

Moreover for the above preferred embodiment of the invention, it is preferred to connect the cover to the vessel element under pressure in a state when the cover is already completely shrinked, cooled and cured, while the vessel element is in the state of its predetermined ductility, temperature and shrinkage, whereby during the further cooling and shrinkage of the vessel element, forces directed from the outside inwards onto the central region for accommodating the metal element act on the cover, and thereby support a particularly reliable and tight connection of the vessel element and the cover, and wherein moreover the meandering structure is preferred for counteracting said forces acting inwards on the cover.

According to a further advantageous embodiment of the invention a circumferential bead/ridge is formed on the inner side of the outer edge of the vessel element. Moreover, in this embodiment of the invention, a step corresponding to the bead/ridge is formed on the outer side of the outer edge of the cover, such that the bead/ridge is latched to the step, as a result of which a particularly close, tight and stable connection of the vessel element and the cover is achieved.

In addition, in this embodiment of the invention, a step is formed on the inner side of the inner edge of the arc of the cover, which corresponds to the inner edge of the vessel element, which surrounds the region for accommodating the metal element, in such a way that the inner edge of the cover is arranged on the inner side adjacent to the protruding inner edge of the vessel element and, in addition, the inner-side step rests on the inner edge of the vessel element, as a result of which it is advantageously ensured that despite shrinkage of the vessel element in direction inwards to the central region for accommodating the metal element, the inner edge of the arc of the cover, which is already in the completely shrinked state, remains in contact with the inner edge of the vessel element, so that a connection of the cover and the vessel element is ensured there as well.

Moreover, in order to provide increased stability to the meandering structure described above, fixed links can be provided between the outer edge and inner edge of the arc of the cover, which connect the outer and inner edges, wherein the fixed links, in particular in the case of an axially symmetrical design of the vessel element and/or of the cover are likewise arranged in an axially symmetrical manner corresponding to the vessel element and/or the cover.

For providing vessels that can be stacked one inside the other in a simple manner, the vessel element is preferably designed as a cone tapering towards the base of the vessel, which in a suitable manner can also pass into a cylinder in the region of the base. In addition, the cover is preferably formed disk-shaped, wherein the vessel element and the cover each have an axial symmetry with an identical axis of symmetry, and wherein the metal element is suitably designed in a preferably flat symmetrical manner.

In this embodiment, which is particularly suitable as a drinking glass, at least three fixed links described above are advantageously formed radially and likewise symmetrical with respect to the axis. In the embodiment which is directed to a drinking glass, the vessel is preferably in particular made of copolyesters such as, for example, Tritan™ from Eastman Chemical Company or polycarbonate, so that the vessel is largely scratch-resistant and transparent, having a corresponding long service life and being aesthetically pleasing. Moreover the metal element is preferably a magnet, so that the vessel is particularly suitable for use as a slip-resistant vessel in interaction with a means of transport and also in interaction with suitable furnishing elements, and so that the vessel is particularly suitable for use in a vehicle of any kind and/or for use as a slip-resistant, safe standing and manageable vessel for persons with reduced motor skills and/or attention and/or perception. A particularly preferred magnet for providing an above embodiment of the invention is advantageously formed as a flat disc-shaped cylinder with axial polarity, which in particular can preferably be a neodymium magnet supplied with a copper-nickel protective layer.

In addition to the metal element, the vessel can accommodate an RFID tag in the central closed region of its recess, wherein the optically aesthetic overall impression of the vessel is moreover not adversely affected.

Means of transport as mentioned above, as well as mentioned within the overall context of the application, have the meaning of in particular means of transport for the transport of drinking vessels in gastronomy and/or social events such as suitably designed serving carts, serving trays, etc., wherein each of which comprise and/or interact with suitable metal elements interacting with a magnet.

When herein above a vehicle or a vehicle of any kind is mentioned, as well as elsewhere in the application, then in this regard within the entire context of the application in each case land crafts as well as road or rail vehicles of all types and other types of vehicles such as ships, yachts, boats, ropeways, airplanes, etc., each incorporating suitably designed furnishing elements, are included.

When herein above, as well as elsewhere in the application, persons with reduced motor skills and/or attention and/or perception are mentioned, then in particular people such as children or people in need of care are meant, whose safe proper handling of vessels for liquids such as drinking glasses may be doubtful and for whom therefore a slip-resistant vessel is particularly suitable.

When herein above, as well as elsewhere in the application, the use as a decorative element is mentioned, then within the entire context of the application, in particular and by way of example, the use of a vessel comprising a magnetic metal element in cooperation with metallic furnishing elements, such as wall and ceiling elements, cabinets, shelves, lights, etc., is meant. For example one or more vessels can optically particularly aesthetically interact with light sources of lights comprising metallic frames of ceiling lighting, whereby the vessels may interact with the metallic frames.

Moreover polycarbonate or copolyesters as the plastic and neodymium used as a powerful magnetic element are particularly preferred for use of the vessel as an aesthetic decorative element, for example on vertical walls or ceilings and in interaction with light sources, whereby, a selected weight ratio of the magnetic element to the vessel element made of the comparatively lightweight plastic, in particular in the region of approximately plastic/magnet 5:1 with a corresponding volume ratio can be of advantage.

The present invention further relates, in particular, to a method for producing a plastic vessel comprising an accommodated metal element in its base and of an above described plastic vessel according to the invention, respectively, in which in a first step, the cover is produced by means of injection molding, and in which in a second step, the cover is supported/stored until the shrinkage thereof is complete, and in which in a third step, the vessel element is produced by means of injection molding, and in which in a fourth step, the vessel element is cooled to a predetermined working/operating temperature, in which the vessel element still has a predetermined ductility, and in which the shrinkage of the vessel element is not yet fully completed during cooling, and in which in a fifth step, at the predetermined working/operating temperature of the vessel element the metal element is fitted on the vessel element, wherein the metal element is arranged in the central region of the vessel element; and wherein in a sixth step, at the predetermined working temperature the completely shrinked cover is connected with the vessel element under the action of pressure on the cover while at the same time the vessel element is subject to its thermoplastic shrinkage, so that the vessel element forms a permanent connection with the cover and the complete plastic vessel is provided comprising the metal element accommodated in its base.

The above embodiment of the method according to the invention is particularly preferred, since the method allows a metal element to be completely accommodated in a plastic vessel and in particular in the base of a plastic vessel, even together with an RFID tag without the occurrence of cracks in the plastic.

Moreover the above embodiment of the method according to the invention is particularly preferred, since the method allows a cost-effective mass production of vessels according to the invention. In addition, the pre-produced cover allows the cover to be provided with a predetermined color in a simple and cost-effective manner.

Moreover the above embodiment is particularly of advantage, since it further allows to completely accommodate a magnetic element in the base of a plastic vessel without substantially affecting the above mentioned intended interaction of the vessel with a suitable transport means and its corresponding intended use particularly as a non-slip drinking vessel in a vehicle.

Regarding the above described preferred use of copolyesters or polycarbonate as plastic material for the vessel, in particular the above mentioned working temperature of about 120 degrees (Celsius) in the interior of the plastic is of advantage, since at this temperature the magnetic properties of the magnetic element are largely preserved in particular when using a neodymium magnet, and since moreover, the ductility and further shrinkage of the plastic in this temperature range, in particular in interaction with a suitable pressurization during the further cooling and solidification, allow forming a non-detachable connection/compound of the vessel element with the cover without undesirable crack formation in the plastic and thus a sealing of the metal element, which can be a magnet.

Since, in particular, the metal element is not surrounded with its entire surface by the predetermined working temperature and is therefore merely insignificantly heated when the vessel element and the cover are connected, the temperature behavior of the metal element has no impairing influence on the curing behavior of the plastic, wherein moreover a magnetic metal element is only minimally affected in its magnetization.

Moreover the above embodiment is particularly of advantage, since the vessel element and the cover are injection-molded independently of one another in different steps, as a result of which a separate coloration, in particular of the cover, is possible in a simple manner, allowing in particular, a cost-effective aesthetic visual individualization of individual vessels but also of different vessel series. Hereby, in addition the use of the vessel as a decorative element according to the invention benefits.

Under these circumstances, the magnetic but also a non-magnetic metal element, which, when using a transparent plastic such as, for example, preferably copolyesters or polycarbonate, can likewise be visible from the outside through the base or the foot of the vessel, and can also be provided with decorative elements or individualizations such as, for example, names, logos, data, etc., and can contribute independently to an individual aesthetic overall impression of the vessel.

Moreover the above embodiment is particularly of advantage, since by making use of the thermoplastic properties, in particular of the vessel element, in interaction with a completely cured and shrinked cover, the cover can be designed to be suitably smaller than the vessel element, whereby the cover and the vessel element can be designed in terms of their relative dimensions with regard to the dimensions of the vessel in such a way that, in particular in the embodiment of an axially symmetrical design of the vessel element and cover, the shrinkage of the vessel element also acts radially on the cover and thus contributes to a non-detachable connection of the vessel element and the cover. In addition by these measures an aesthetic desirable overall impression of the plastic vessel is further enhanced.

Moreover according to a modification of the preceding embodiment, the vessel element can be pre-produced and pressed as a completely cured and shrinked vessel element on a not yet completely cured/cooled cover, though being comparatively more complex and less reliable. For this reason the above described embodiment according to the invention with the pre-produced cover is advantageous and is therefore preferred.

According to a further preferred embodiment of the invention, in a further step of the above method according to the invention, the joint contact line between the vessel element and the cover can additionally be provided with a weld seam, as a result of which the sealing of the accommodated metal element is further enhanced.

According to a further preferred embodiment of the method of production according to the invention, the vessel element is arranged with its base upwards on a magnetic mandrel at least when the vessel element is fitted with the metal element comprising a magnet, so that when the metal element is fitted on the vessel element, a predetermined polarity of an axially polarized magnet is advantageously predefined in a simple and cost-effective manner, which moreover eliminates the need for complex care in the storage and positioning during the fitting of the metal elements and is accordingly inexpensive.

For providing a preferred accommodation of a suitable, essentially two-dimensionally formed RFID tag together with the metal element, the RFID tag can first be connected to the metal element and subsequently the vessel can be fitted with the RFID tag and the metal element. For this purpose, for example, the RFID tag can be adhesively bonded to the metal element and/or a metallic antenna element of the RFID tag can also adhere to a magnetic metal element due to its magnetic properties.

According to a further advantageous embodiment of the invention an above plastic vessel is used in particular as a drinking vessel in interaction with a means of transport and in particular in a vehicle of any kind.

According to a further advantageous embodiment of the invention a plastic vessel according to the invention, which accommodates a metal element and which in particular accommodates a metal element containing a magnetic element according to the invention is used in particular as a drinking vessel in interaction with a means of transport and in particular in a vehicle of any kind and/or for persons with impaired motor skills and/or attention and/or perception and/or as a decorative element.

BRIEF DESCRIPTION OF THE DRAWINGS

For a better understanding of the invention, the above-mentioned embodiments are described in detail below together with further advantageous embodiments with reference to schematic accompanying drawings.

In this regard shows:

FIG. 2a an enlarged detail A of a section of the vessel of FIG. 1d taken along the line V-V of FIG. 1d, FIG. 2b the base of the vessel element of FIG. 2a, FIG. 2c the metal element of FIG. 2a, and FIG. 2d the cover of the vessel element of FIG. 2a;

FIG. 4a an enlarged view of the detail A of the vessel element of FIG. 2b according to a further preferred embodiment of the invention, FIG. 4b an enlarged view of the detail A of the cover of FIG. 2d corresponding to the embodiment of FIG. 4a, FIG. 4c the details A1 of FIGS. 4a and 4b viewed together whereby the cover is arranged on the vessel element, FIG. 4d the detail of A1 of FIG. 4c according to a further preferred modification of the invention, and FIG. 4e the detail A2 of FIGS. 4a and 4b viewed together whereby the cover is arranged on the vessel element, FIG. 5a a preferred modification of the cover of FIG. 3c, FIG. 5b the other side of the cover of FIG. 5a, and FIG. 5c a sectional view of the cover of FIG. 5a taken along line S-S of FIG. 5a;

DETAILED DESCRIPTION OF THE INVENTION

Figure 1A:
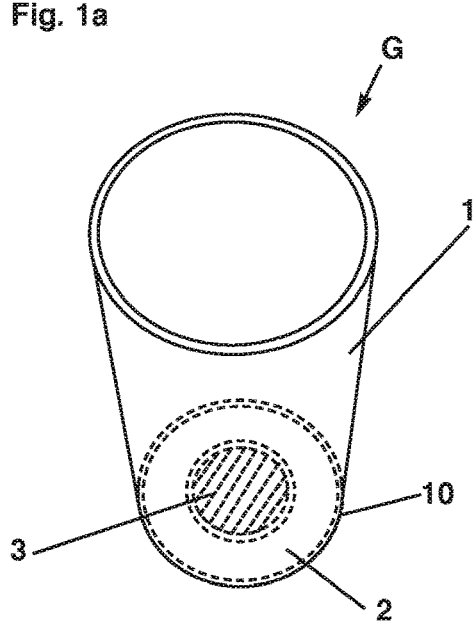
FIG. 1a a schematic perspective view of a vessel according to an embodiment of the invention viewed obliquely from above, FIG. 1b the vessel of FIG. 1a viewed obliquely from below, FIG. 1c a plan view of the vessel of FIGS. 1a and b, FIG. 1d a side view of the vessel of FIGS. 1a and b, FIG. 1e a schematic enlarged perspective view of the metal element of the vessel of FIGS. 1a, b, c and d.
Figure 1B:
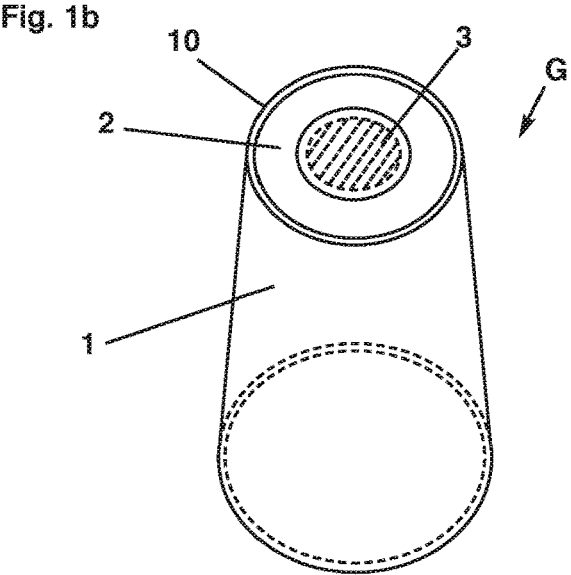
FIG. 1f a sectional view of the metal element of FIG. 1e taken along the line V-V of FIG. 1e.
Figure 1C:
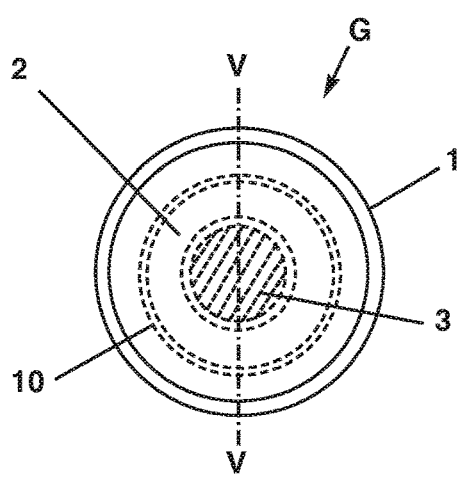
Figure 1D:
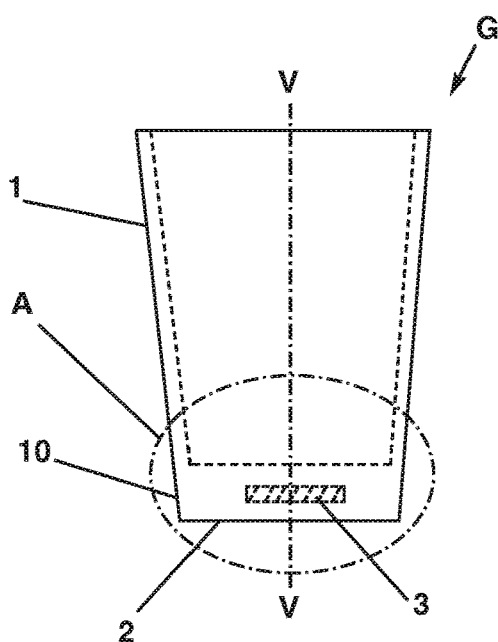

FIG. 1a shows a schematic perspective view of a vessel G according to an embodiment of the invention obliquely from above with the vessel element 1, with the base 10 on which the cover 2 is arranged, wherein a space is provided for accommodating a metal element 3, and FIG. 1b shows a corresponding perspective view of the vessel G of FIG. 1a obliquely from below. FIG. 1c shows a schematic plan view of the vessel G of FIGS. 1a and b, and FIG. 1d shows a side view of the vessel G from FIGS. 1a, b and c, in each case with the vessel element 1, the base 10, the cover 2 and the metal element 3, respectively, wherein in particular in the illustration of FIG. 1d, details of the cover 2 have been omitted for the sake of clarity. Line V-V of FIGS. 1c and d in each case characterizes a longitudinal section through the center of the vessel G, which in the embodiment of FIG. 1 is formed by way of example and advantageously axially symmetrical with the line V-V of FIG. 1d as an axis of symmetry and which has the shape of a cone tapering towards the base 10 of the vessel element 1, which is advantageous for a vessel G which can be stacked well into one another and which can in particular be a drinking vessel.

Figure 1E:
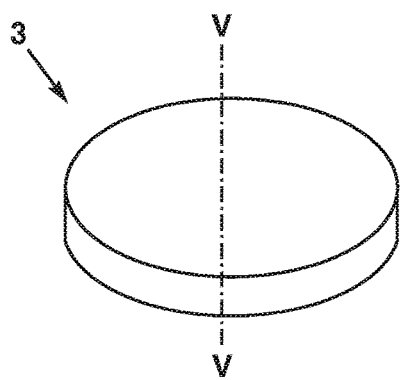
Figure 1F:
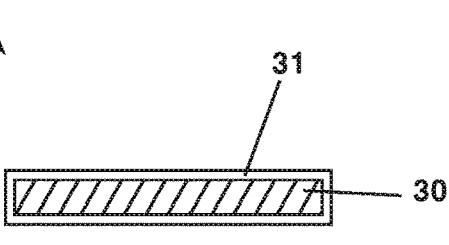

FIG. 1e shows an enlarged perspective view of the metal element 3 of FIG. 1a to d, which is preferably formed in a flat cylindrical shape, wherein its flat cylinder corresponds approximately to a central recess between the vessel element 1 and the cover 2, which is described in detail below with reference to FIG. 2. FIG. 1f shows a section through the metal element 3 of FIG. 1e taken along the line V-V of FIG. 1e, wherein the metal element 3 is, by way of example and advantageously, a magnetic element 30 which is covered by a protective layer 31.

The vessel element 1 and the cover 2 of the plastic vessel G of FIG. 1 are particularly preferred for use of the vessel as a drinking glass and in particular for use as a non-slip vessel in a vehicle, preferably made of copolyester or polycarbonate, and thus transparent with a long service life. Therefore the vessel G is furthermore suitable, in particular, for persons with restricted perception and/or attentiveness and/or motor skills. The metal element 3 can in particular preferably be a neodymium magnet 30 with a copper-nickel protective layer. Moreover copolyesters or polycarbonate as plastic and neodymium as a powerful permanent magnet are particularly preferred for use of the vessel as a decorative element, for example on vertical walls of, for example, a refrigerator and/or in the vicinity and in interaction with light sources. Hereby, a weight ratio of plastic to magnetic element of approximately 5:1 and a volume ratio of plastic/metal which corresponds to the weight ratio and which makes it possible, that the vessel can also be permanently disposed or stored with its base upwards and its opening downwards, for example in gastronomy, so that the interior of the vessel is largely protected from dust and dirt.

Figure 2A:
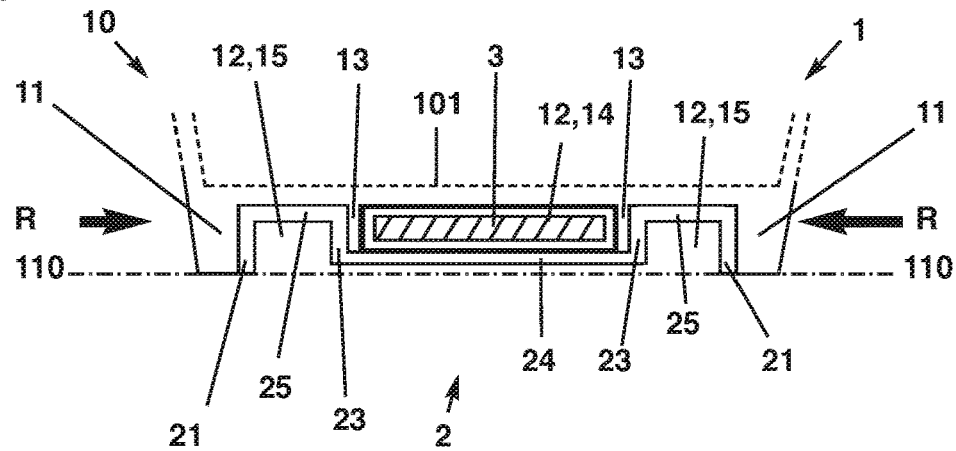

FIG. 2a shows the enlarged detail A of FIG. 1d of a section through the vessel G of FIG. 1 taken along the line V-V of FIG. 1d with the bottom 101 of the vessel element 1 and the base 10 of the vessel element 1 together with its cover 2 and with its embedded metal element 3.

Figure 2B:
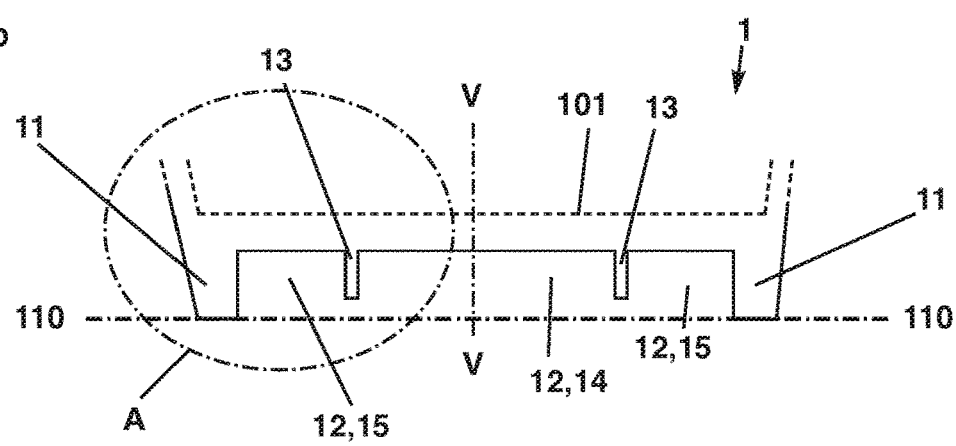
Figure 2C:
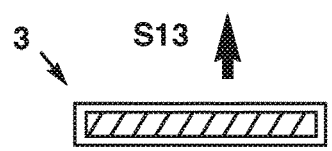
Figure 2D:
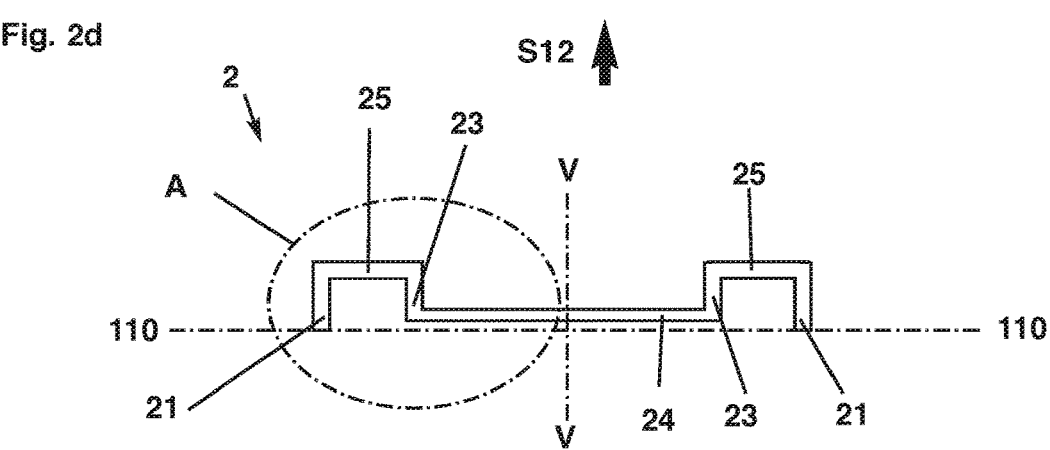

FIG. 2b shows the base 10 of the vessel element 1 of FIG. 2a, FIG. 2c shows the metal element 3 of FIG. 2a, and FIG. 2d shows the cover 2 of the vessel element 1 of FIG. 2a, wherein FIGS. 2b, c and d show the base 10 of the vessel element 1 with the accommodated metal element 3 and with the cover 2 when viewed together as an exploded view of FIG. 2a, and wherein moreover, the arrows S13 and S12 indicate the direction of their composition/assembling to the complete base 10 of the vessel element 1 of FIG. 2a, as well as subsequent steps of the method of producing a plastic vessel G according to the invention, in which in one step in the direction S13 the metal element 3 is positioned/fitted at its predetermined position on the vessel element 1, whereupon in a further step in the direction S12 the cover 2 is connected to the vessel element 1 and the magnet element 3 is enclosed and accommodated by the vessel element 1 and the cover 2.

The vessel element 1 of FIGS. 2a and b comprises a lower outer edge 11, which encloses a lower recess 12 formed in its base 10. In addition the above vessel element 1 comprises an inner edge 13 spaced apart from the outer edge 11, which surrounds a central region 14 of the recess 12 for accommodating the metal element 3, wherein a region 15 of the recess 12 is provided between the inner edge 13 and the outer edge 11, which surrounds the central region 14.

The cover 2 of FIGS. 2a and 2d comprises an arc 25 which rises with respect to its central region 24 and which surrounds the central region 24, wherein the arc 25 is formed so as to correspond to the recess 15, wherein the arc 25 is arranged in the recess 15 when the region 14 is covered with the cover 2, and wherein the arc 25 of the cover 2 has an outer edge 21, which is the outer edge 21 of the cover 2, and which corresponds to the outer edge 11 of the vessel element 1 and which is arranged adjacent thereto. In addition the arc 25 of the cover 2 has an inner edge 23, which corresponds to the inner edge 13 of the vessel element 1 and which is arranged adjacent to the inner edge 13. The cover 2 thus has a meandering structure in the sectional view of FIGS. 2a and d, the profile of which corresponding to the profile of the base 10 of the vessel element 1. The meandering structure thus has a surface, which can be brought into direct contact with the surface of the profile of the base 10 of the vessel element 1, whereby a particularly stable connection of the cover 2 with the vessel element 1 is facilitated.

The above structure of the cover 2 and of the vessel element 1 is particularly advantageous for the production of a plastic vessel according to a preferred embodiment of the invention, in which an already completely cured/shrunken cover 2 is connected to a not completely cured vessel element 1 at a predetermined temperature in the interior of the plastic of for copolyester and polycarbonate at about 120 degrees (Celsius) under the action of pressure, and wherein through the remaining shrinkage of the vessel element 1 according to this embodiment of the invention a corresponding pressure, which is directed radially from the outside in the direction R onto the cover 2 is generated, so that a non-detachable connection is supported.

The central region 14 for accommodating the metal element 3 preferably corresponds substantially to the flat cylindrical metal element 3 of FIGS. 2a and 2c, so that the accommodated metal element 3 is arranged adjacent to the bottom of the inner region 14 and the inner edge 13 of the vessel element 1 and to the central region 24 of the cover 3, and is supported by the inner region 14 and the central region 24.

Moreover, in the embodiment of the invention of FIG. 2, the edge 11 of the vessel element 1 and the adjacent edge 21 of the cover 2 preferably provide approximately one level 110 on which an erected vessel G rests.

Figure 3A:
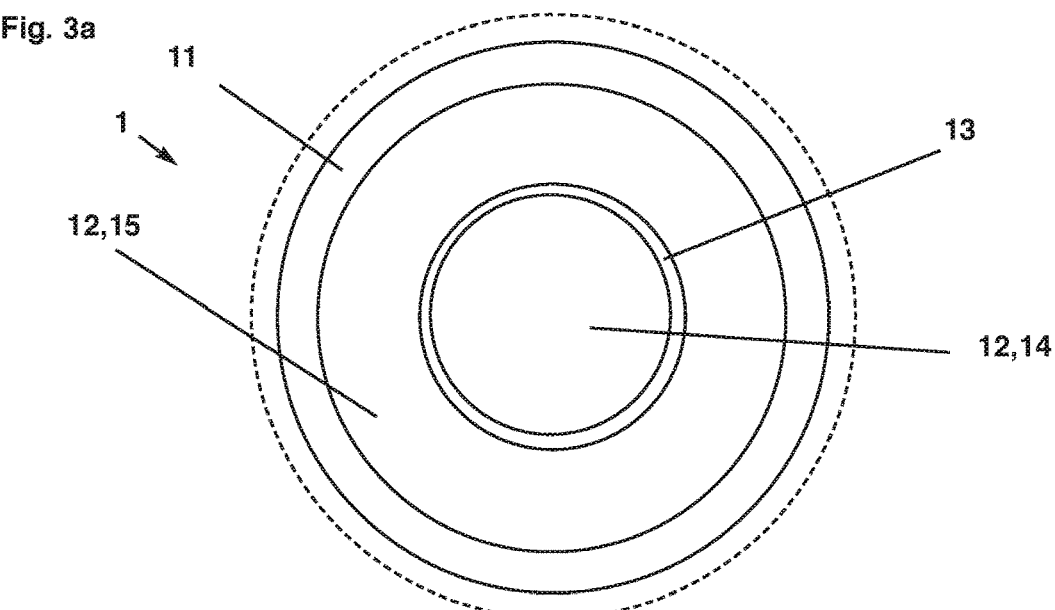
FIG. 3a the vessel element of FIG. 2b from below.

FIG. 3a shows a schematic view of the vessel element 1 of FIGS. 2a and b from below, i.e. from the side facing the cover 2 with the recess 12, the central region 14 of the recess 12, the inner edge 13, the outer region 15 of the recess 12 and the outer edge 11.

Figure 3B:
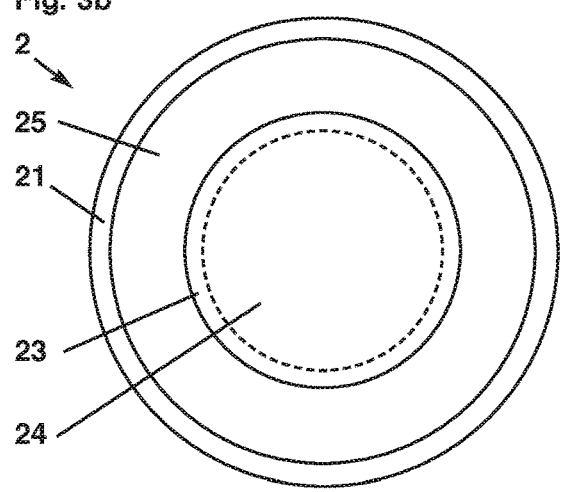
FIG. 3b the cover of the vessel element of FIG. 2d viewed from the side opposite to the vessel element, FIG. 3c the cover of the vessel element of FIG. 2d viewed from the side facing the vessel element, and FIG. 3d a perspective view of the detail A of FIG. 1d of the vessel of FIG. 1d viewed obliquely from below.

FIGS. 3b and c each show the cover 2 of the vessel element 1 of FIGS. 2a and d from the side facing away from the vessel element 1 and from the side facing the vessel element 1, respectively, in each case with the central region 24, the arc 25, the inner edge 23 of the arc 25 and the outer edge 21 of the arc 25, whereby the cover 2 with the meandering structure according to FIGS. 2a and d is substantially formed disc-shaped.

Figure 3C:
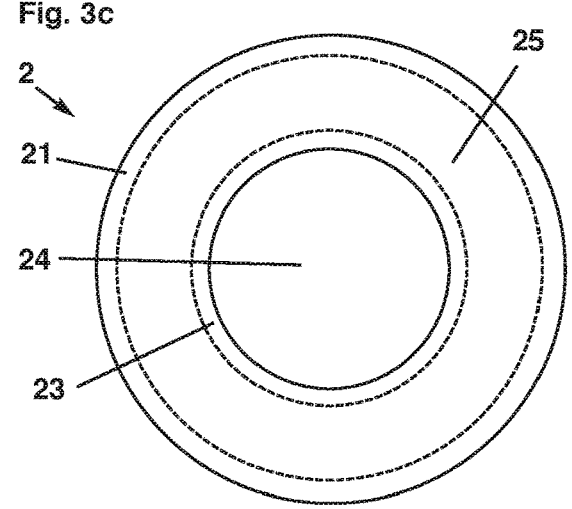
Figure 3D:
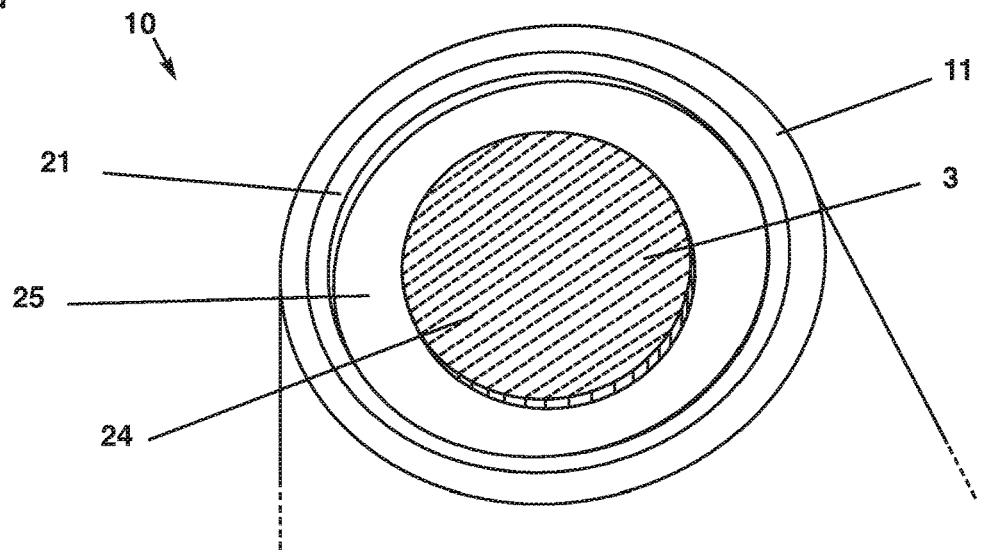

FIG. 3d shows an enlarged perspective view of the detail A of the assembled vessel G of FIG. 1d obliquely from below with the base 10 of the vessel element 1, the outer edge 11 of the vessel element 1 and with the outer edge 21, the annular arc 25 and the central region 24 of the cover 2 and with the accommodated metal element 3.

Figure 4A:
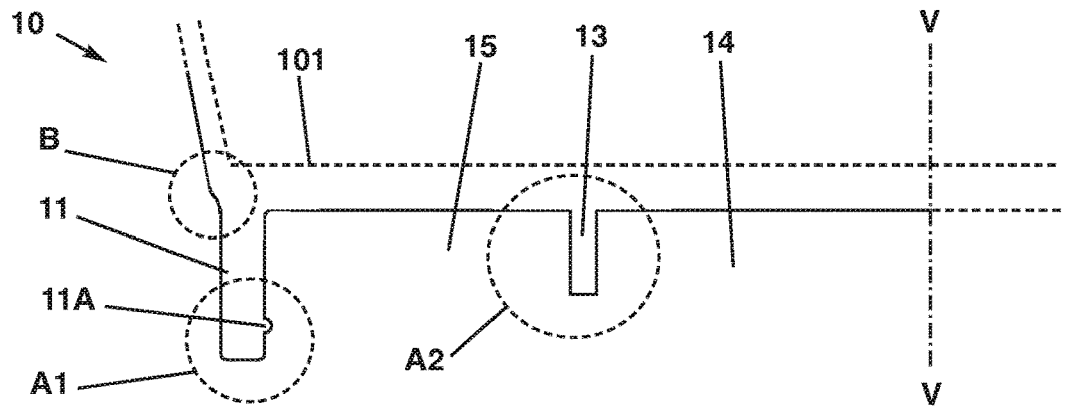
Figure 4B:
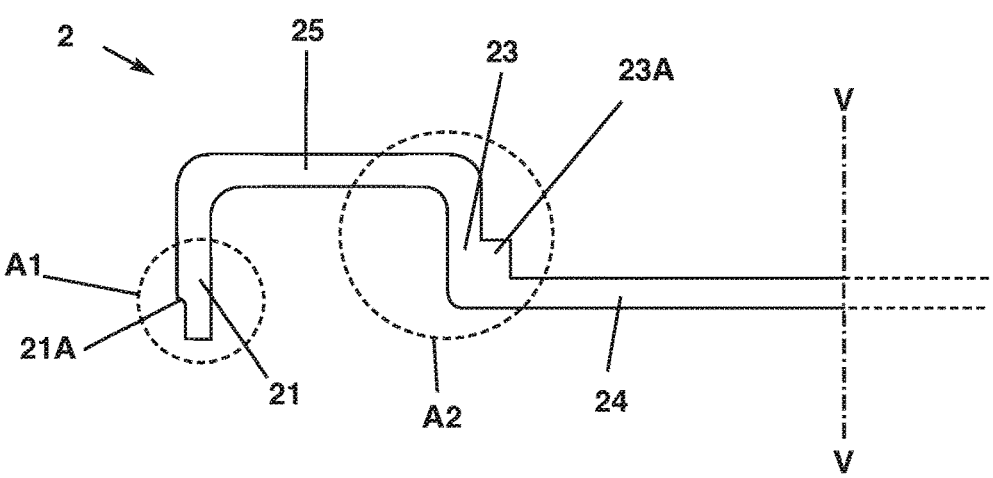

FIG. 4a shows an enlarged view of the detail A of the base 10 of the vessel element 1 of FIG. 2b which is axially symmetrical to the axis of symmetry V-V according to a further preferred embodiment of the invention, and FIG. 4b shows an enlarged view of the detail A of the cover 2 of FIG. 2d, which is modified corresponding to the embodiment of the vessel element 1 of FIG. 4a.

The vessel element 1 of FIG. 4a, which is likewise axially symmetrical to the axis of symmetry V-V, corresponds to the vessel element 1 of FIGS. 2a and b and is likewise formed as a cone tapering towards its base 10, which turns into a cylinder in the region B of its base 10. Contrary to the embodiment of FIGS. 2a and b, in addition a ridge 11A is formed on the inner side of the outer edge 11, and the inner edge 13 is reduced by a predetermined amount relative to the edge 13 of the embodiment of FIGS. 2a and b. In other respects, the vessel element 1 of FIG. 4a corresponds to the vessel element 1 of FIGS. 2a and b, whereby reference is made in this regard to the corresponding description of said figures, accordingly.

Figure 4C:
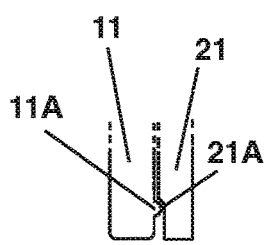
Figure 4D:
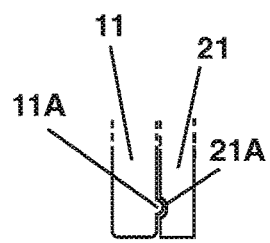

The cover 2 of FIG. 4b, which is likewise axially symmetrical to the axis of symmetry V-V, is formed disc-shaped in accordance with the embodiment of FIGS. 2a and d with a substantially meandering section through a plane, which comprises the axis of symmetry V-V of FIG. 1d. Contrary to the embodiment of FIGS. 2a and d, a step 21A is formed on the outer edge 21, which corresponds to the ridge 11A of the outer edge 11 of the embodiment of FIG. 4a such that, when the cover 2 is arranged on the base 10 of the vessel element of FIG. 4a, the step 21A of the edge 21 latches with the ridge 11A of the edge 11. In this connection reference is made to FIG. 4c, which shows the section A1 of the cover 2 of FIG. 4b together with the section A1 of the vessel element 1 of FIG. 4a. In this connection a modification of the design of the cover 2 of FIGS. 4b and c is shown in FIG. 4d, in which the step 21A is formed as a groove.

Figure 4E:
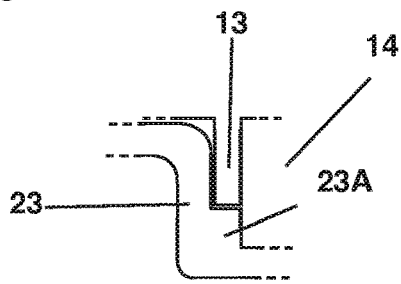

Further contrary to the embodiment of FIGS. 2a and d, in this embodiment a step 23A is formed on the inner side of the inner edge 23 of the cover 2, which corresponds to the inner edge 13 such that, when the cover 2 is arranged on the base 10 of the vessel element 1 of FIG. 4a, step 23A rests on the edge 13. In this connection reference is made to FIG. 4e, which shows section A2 of the cover 2 of FIG. 4b together with section A2 of the vessel element 1 of FIG. 4a.

Regarding further features the cover 2 of FIG. 4b corresponds to the cover 2 of FIGS. 2a and d, whereby reference is made in this regard to the corresponding description of said figures, accordingly.

The embodiments of the vessel element 1 described above with reference to FIGS. 4a to e with the ridge 11A and the edge 13 with a predetermined height and the cover 2 formed corresponding to the vessel element 1 with the step 21A, which can also be designed as a groove, and with the step 23A, which rests on the edge 13, is particularly preferred, since it permits, in particular, a secure, stable and tight connection of the cover 2 and the vessel element 1, in particular in the case of a connection of a cover 2 which has already been shrinked with an incompletely cured vessel element 1 at a predetermined temperature and with a corresponding, in particular radially acting, thermoplastic shrinkage of the vessel element 1 under the action of an external, in particular axially acting pressure means during the production of the vessel.

Figure 5A:
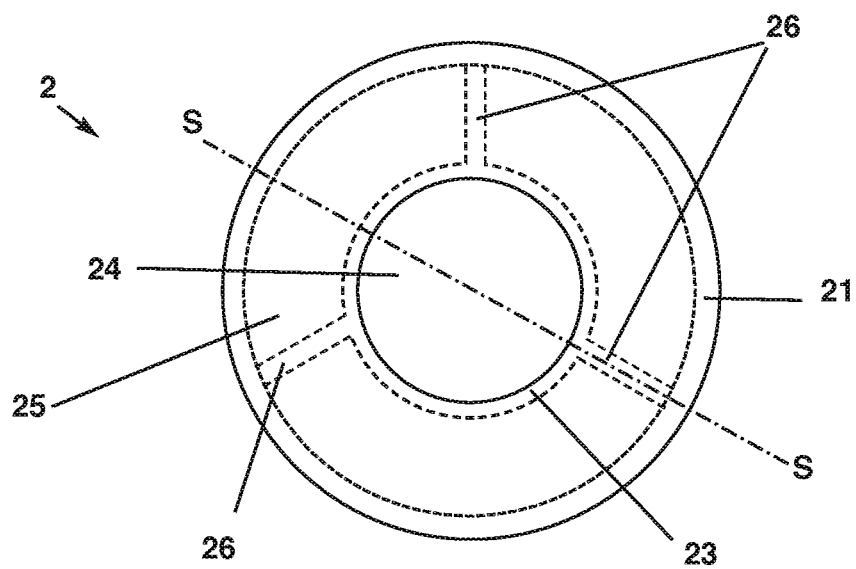
Figure 5B:
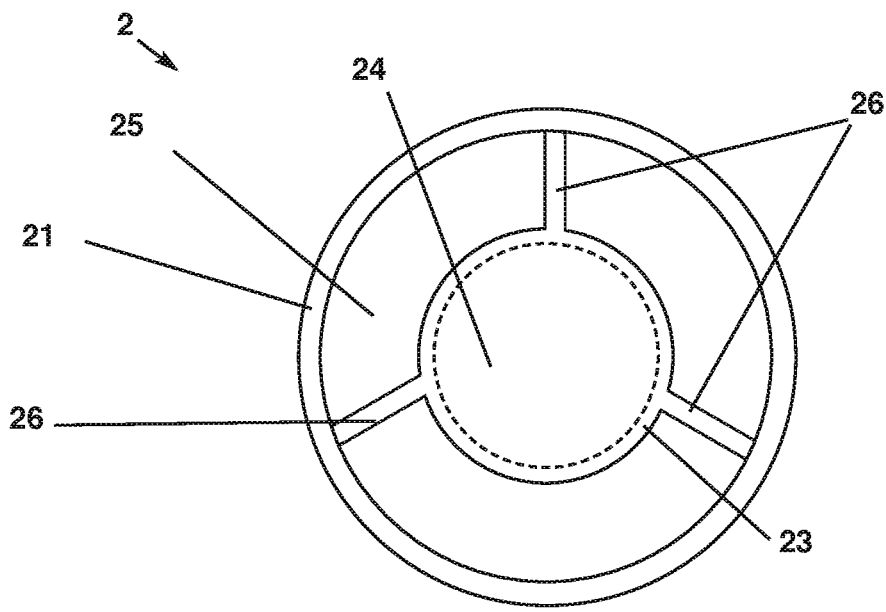
Figure 5C:
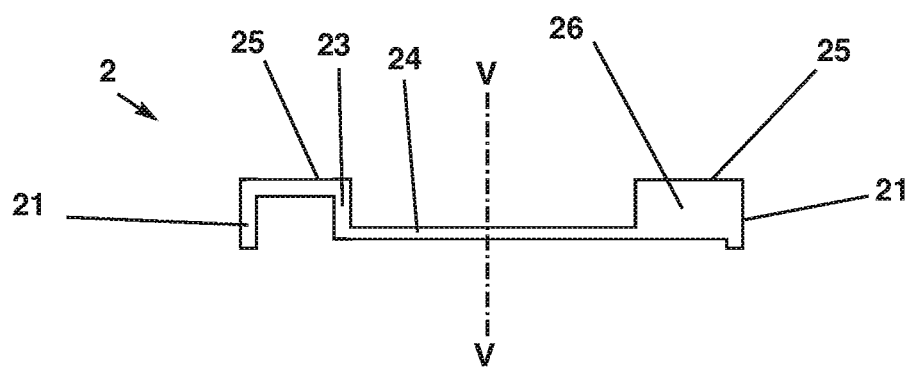

FIG. 5a shows a further preferred modification of the cover 2 from the side facing the vessel element 1 of FIG. 3c, FIG. 5b shows the other side of the cover of FIG. 5a, and FIG. 5c shows a section through the cover of FIG. 5a taken along the line S-S of FIG. 5a.

The cover 2 of the embodiment of FIG. 5 is substantially disc-shaped like the cover 2 of FIGS. 3b and c and comprises, contrary to the cover 2 of FIGS. 3b and c in addition radial fixed links 26 arranged axially symmetrical with respect to the axis of symmetry V-V of FIGS. 1d and 5c, which connect the outer edge 21 of the arc 25 to its inner edge 23, and which stabilize and support the cover 2, in particular with respect to forces acting radially from the outside onto the edge of the cover 2, caused by thermoplastic shrinkage of an incompletely cured vessel element 1 and/or caused by an external pressure means for providing a predetermined pressure during the proceeding connection of the cover 2 to the vessel element 1. To provide the above support in the embodiment of FIG. 5a, by way of example preferably three trigonal arranged fixed links 26 are formed. In addition, the fixed links 26 also facilitate an exact positioning of the cover 2 at its predetermined position on the vessel element 1 by means of a mounting tool during the production. Regarding further features, the cover 2 of FIG. 5 corresponds to the cover 2 of FIGS. 2, 3 and 4, whereby reference is made in this regard to the corresponding description of the figures, accordingly.

Figure 6A:
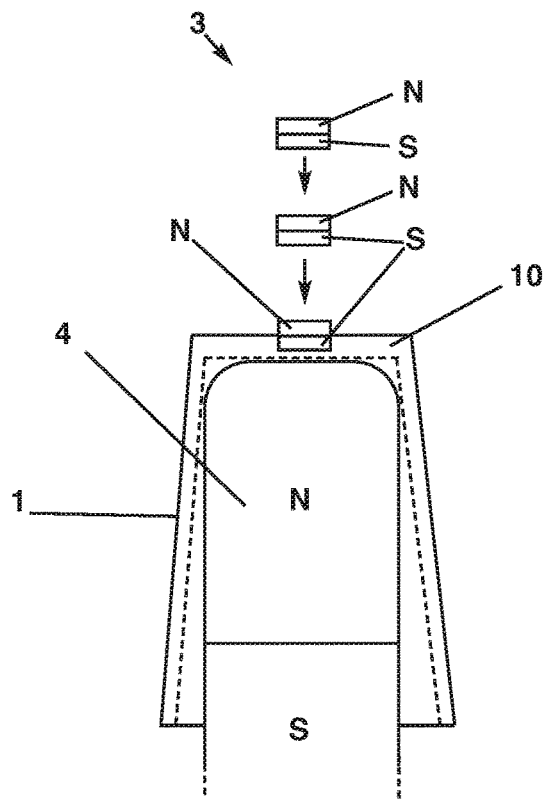
FIGS. 6a and 6b a schematic view of a preferred step of an embodiment of the method of production according to the invention, and FIG. 6c the vessel of FIG. 1d further together with an RFID Tag.
Figure 6B:
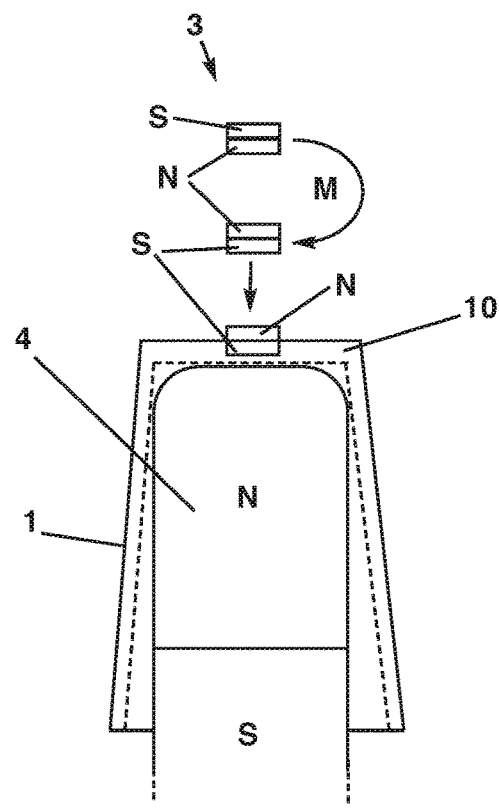

FIGS. 6a and 6b show a schematic view of an advantageous step of an embodiment of the method for producing a vessel comprising an accommodated metal element according to the present invention during the fitting of a metal element 3 comprising a magnet with axial polarity to the vessel element 1. The above step is characterized in that the vessel element 1 is arranged on a magnetic mandrel 4, which can preferably be a permanent magnet, whereby the magnetic mandrel 4 is polarized having a predetermined orientation of its polarity which is specified for the metal element 3, such that when the metal element 3 is fitted on the base 10 of the vessel element 1 a predetermined orientation of the metal element 3 is defined in its fitted position.

In this connection FIG. 6a shows the fitting of the metal element 3 by means of a fitting tool (not shown for the sake of clarity), in which the polarity of the metal element 3 is oriented such that the metal element 3 is attracted by the magnetic mandrel 4.

On the other hand FIG. 6b shows the fitting of the metal element 3, in which the polarity of the metal element 3 is oriented in the opposite direction to the polarity of the metal element 3 of FIG. 6a during the fitting, whereby a torque M is exerted on the metal element 3 by the magnetic mandrel 4, such that the metal element 3 is rotated into an orientation which corresponds to the orientation of the metal element 3 of FIG. 6a, whereby that the metal element 3 is likewise attracted by the mandrel 4 and is arranged at its predetermined position on the base of the vessel element 1.

The provision and use of an above mandrel 4 according to the invention when fitting a magnetic metal element 3 on the vessel element 1 is particularly preferred for a facile and cost-effective production of stackable vessels G, which comprise magnetic metal elements 3, since an identical orientation of the polarity of the metal element 3 is ensured.

Moreover, for example, by providing a second mandrel 4 (not shown in FIG. 6 for the sake of clarity) with a permanent magnet with reversed polarity, the polarity of the magnetic metal element 3 of a predetermined first series of vessels G can be provided, while a predetermined second series can be provided in a facile manner with an oppositely poled magnetic metal element 3. In addition in this embodiment, the first and second series can differ in a suitable manner by the formation of further distinguishing features such as, for example, by providing in each case for a series a different facile coloration of the prefabricated coverings 2 according to the invention.

The production of different series of vessels G with oppositely poled magnetic metal elements 3 can be desirable in particular for the use of a vessel G as a decorative element according to the invention, since such vessels can be applied attracted to each another in pairs at their base. By way of example, two vessels G which are particularly flat approximately in the shape of a shell can adhere to one another on opposite sides of, for example, a shower curtain, or such vessels of different series can be used not only individually but also for example as composite vessels G as, for example, elevated drinking vessels or flower vases, in which in each case one vessel serves as an enlarged base of the vessel assembled in this way, etc.

Moreover particularly for the provision of a first and second magnetic mandrel 4 for facile production of different series of vessels G with predetermined different polarity of the magnetic metal element 3 thereof, as an alternative to differently equipped mandrels 4 with corresponding permanent magnets, moreover a suitable electromagnet can be used for providing a defined predetermined orientation of the polarity of the magnet element 3 by a corresponding single mandrel 4, only, wherein the polarity of the electromagnet can be reversed in a simple manner upon request.

Figure 6C:
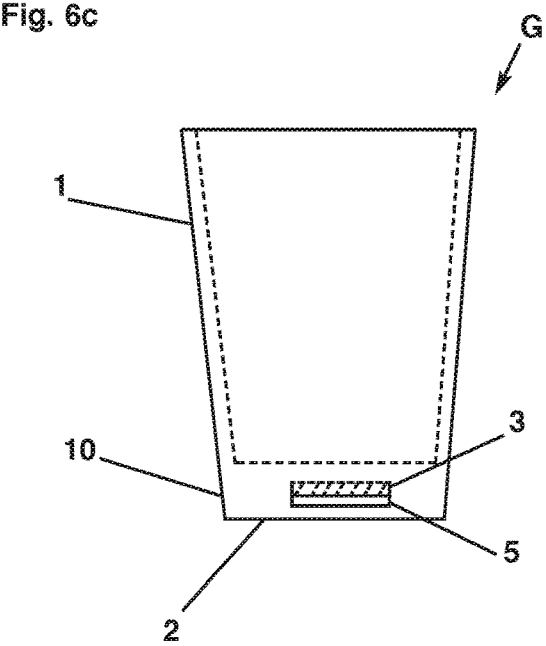

FIG. 6c shows a modification of the vessel 1 of FIG. 1d, wherein the vessel 1, together with the metal element 3, additionally accommodates an RFID tag 5, wherein the RFID tag 5 is arranged, for example, adjacent to the metal element 3.

Figure 7:
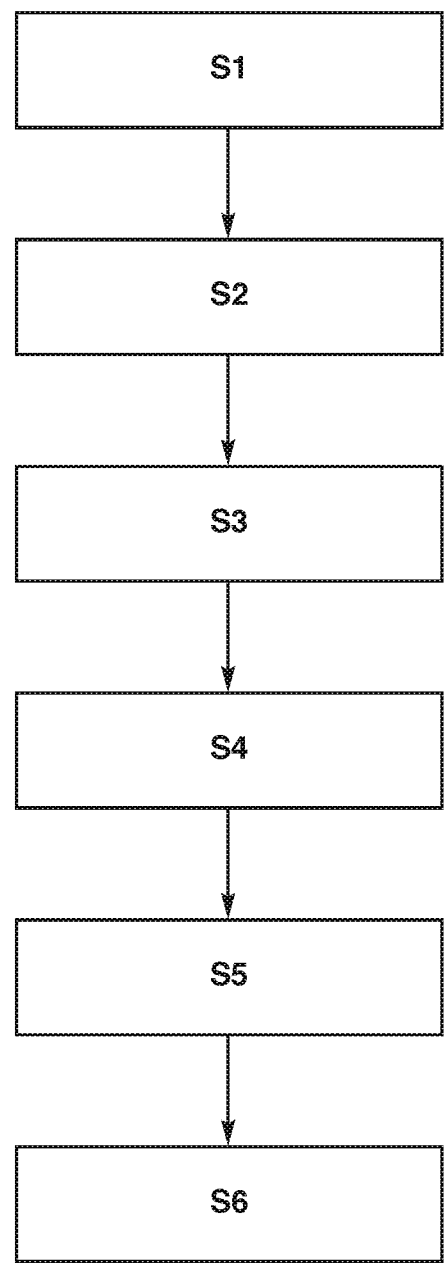
FIG. 7 a schematic flow diagram of the essential steps of an embodiment of the method of producing a vessel according to the invention.

FIG. 7 shows a schematic flow diagram of the essential steps of an embodiment of a preferred method for producing a vessel G according to the invention, wherein in a first step S1 the cover 2 is produced by means of injection molding. After the production thereof, the cover 2 is supported/stored in a second step S2 until its shrinkage has been completed. In a third step S3, the vessel element 1 is produced by means of injection molding and is cooled down to a predetermined working temperature in a fourth step S4, in which the vessel element 1 still has a predetermined ductility, in which the shrinkage of the vessel element 1 is not yet completely terminated.

Subsequently, in a fifth step S5 at the predetermined working temperature of the vessel element 1, the vessel element 1 is fitted with the metal element 3, wherein the metal element 3 is arranged in the central region 14 of the vessel element 1. In a further sixth step S6, at the predetermined working temperature, the completely shrinked cover 2 is connected with the vessel element 1 under the action of pressure and cooled down, so that the vessel element 1 forms a permanent connection with the cover and the complete plastic vessel is provided with the metal element 3 accommodated in its base 10.

In the embodiment comprising an accommodated metal element together with an RFID tag, the RFID tag can be at first connected in a suitable manner to the metal element 3 and subsequently in step S5 the vessel 1 can be equipped with the combined RFID tag 5 and metal element 3. For example, the RFID tag 5 can be adhesively bonded to the metal element 3 for this purpose and/or a metallic antenna element of the RFID tag can adhere to a magnetic metal element 3 due to its magnetic properties.

The present invention has been described above by way of example with reference to FIGS. 1 to 7 on the basis of a vessel G which is advantageously formed in an axially symmetrical manner and which comprises a conical vessel element 1 tapering towards its base 10, wherein, however, it is clear, that a plastic vessel which accommodates a metal element 3 according to the invention can also be provided in many different predetermined geometries and shapes, with, for example, a square or hexagonal or oval cross-section of the vessel element 1 and/or of the cover 2, etc.

REFERENCE SIGNS 1 vessel element
10 base
101 bottom
11 outer edge
11A inner ridge
110 lower level, base level
12 recess
13 inner edge
14 central region
15 outer region
2 cover
21 outer edge
21A step
23 inner ridge
23A step
24 central region
25 arc
26 fixed link
3 metal element
30 magnet
31 layer
4 mandrel
5 RFID Tag

The invention claimed is:

1. Plastic vessel comprising a metal element which is accommodated in its base, characterized in that:
the plastic vessel comprises a vessel element and a cover such that the plastic vessel is formed in two pieces, wherein a recess is formed in the base of the vessel element, said recess being enclosed by the cover such that a central closed region of the recess is provided, which accommodates the metal element,
wherein the vessel element and the cover are connected to one another thermoplastically under pressure by one of:
thermoplastic shrinkage of the vessel element during cooling and curing thereof after the cover has been completely solidified, or
thermoplastic shrinkage of the cover during cooling and curing thereof after the vessel element has been completely solidified,
wherein the vessel element comprises a lower outer edge, which surrounds the recess and comprises an inner edge which is spaced apart from the outer edge and surrounds the central region,
wherein a region of the recess is provided between the inner and the outer edge, which surrounds the central region, and wherein the cover comprises an arc which rises relative to a central region of the cover and surrounds the central region, and
wherein the arc is formed corresponding to the recess such that, when the cover is arranged to provide the enclosed region the arc being disposed in the recess, and
wherein the arc of the cover has an outer edge, which is the outer edge of the cover, and which corresponds to the outer edge of the vessel element and which is arranged adjacent thereto, and the arc of the cover has an inner edge which corresponds to the inner edge of the vessel element and which is arranged adjacent to said inner edge.

2. Plastic vessel according to claim 1, wherein a circumferential ridge is formed on the inner side of the outer edge of the vessel element, wherein a step corresponding to the ridge is formed on the outer side of the outer edge of the cover, wherein the ridge is latched to the step, wherein a step is formed on the inner edge of the arc, the step corresponding to the inner edge of the vessel element such that the inner edge is arranged adjacent to the inner edge and, whereby the step rests on the inner edge.

3. Plastic vessel according to claim 1, wherein the vessel element is designed as a cone tapering towards the base of the vessel, which turns into a cylinder in the region of the base, and wherein the outer edge of the cover is connected to the inner edge of the arc of the cover by at least three radial fixed links which are arranged symmetrical to one another.

4. Plastic vessel according to claim 1, wherein:
the plastic vessel is a drinking glass made of polycarbonate or copolyester, and the metal element is a neodymium magnet having a copper-nickel coating.

5. Plastic vessel according to claim 1, wherein: in addition to the metal element, the central closed region of the recess further accommodates an RFID tag.

6. Method for producing a plastic vessel according to claim 1, comprising the steps:
in a first step, the cover is produced by means of injection molding;
the cover is supported in a second step until the shrinkage thereof is completed;
in a third step, the vessel element is produced by means of injection molding;
in a fourth step, the vessel element is cooled down to a predetermined working temperature, in which the vessel element still has a predetermined ductility, and in which the shrinkage of the vessel element is not yet completely terminated;

in a fifth step, at the predetermined working temperature of the vessel element, the metal element is fitted on the vessel element, wherein the metal element is arranged in the central region of the vessel element; and in a sixth step, at the predetermined working temperature, the completely shrinked cover is connected to the vessel element under the action of pressure and cooled down, so that the vessel element forms a permanent connection with the cover and the complete plastic vessel is provided, which comprises the metal element, which is accommodated in its base.

7. Method for producing a plastic vessel according to claim 1, comprising the steps:

in a first step, the vessel element is produced by means of injection molding;

the vessel element is supported in a second step until the shrinkage thereof is completed;

in a third step, the cover is produced by means of injection molding;

in a fourth step, the cover is cooled down to a predetermined working temperature, in which the cover still has a predetermined ductility, and in which the shrinkage of the cover is not yet completely terminated;

in a fifth step the metal element is fitted on the vessel element, wherein the metal element is arranged in the central region of the vessel element; and in a sixth step, at the predetermined working temperature, the cover is connected to the vessel element under the action of pressure and cooled down, so that the vessel element forms a permanent connection with the cover and a complete plastic vessel is provided, which comprises the metal element, which is accommodated in its base.

8. Method according to claim 6, with a predetermined working temperature of about 120 degrees (Celsius) and with polycarbonate or copolyester for the plastic used.

9. Method according to claim 6, comprising a further step after the connection of the vessel element and the cover under the action of pressure, wherein the contact line between the vessel element and the cover is further provided with a weld seam.

10. Method according to claim 6, wherein at least during the fitting of the metal element comprising a magnet on the vessel element, the vessel element being arranged on a magnetic mandrel providing an upturned base, so that in the fifth step, when the metal element is fitted on the vessel element a predetermined polarity of an axially poled magnet is defined.

11. Use of the plastic vessel with a metal element comprising a magnet according to claim 1 as a drinking vessel:

in interaction with a drinking vessel comprising a serving cart or a serving tray, in a vehicle, or by persons with at least one of: reduced motor skills or reduced perception.

* * * * *